Dec. 31, 1963     L. T. BARNES     3,116,406

GAS SHIELDED ARC WELDING APPARATUS

Filed July 21, 1961

LAWRENCE T. BARNES
INVENTOR

HUEBNER & WORREL
ATTORNEYS

BY Richard M. Worrel

United States Patent Office 3,116,406
Patented Dec. 31, 1963

3,116,406
GAS SHIELDED ARC WELDING APPARATUS
Lawrence T. Barnes, 6579 N. Diana, Fresno, Calif.
Filed July 21, 1961, Ser. No. 125,832
2 Claims. (Cl. 219—75)

This invention relates generally to gas shielded arc welding apparatus using a non-consumable electrode. The invention relates particularly to an electrode support, adaptable for use with a conventional jaw-type torch commonly used for holding consumable electrodes, in which the support performs the dual function of an electrical conductor between the conventional torch and the electrode as well as a conduit for a shielding envelope of inert gas around the arc at the operating tip of the electrode.

In their day-to-day operations, small commercial welding shops perform a great variety of welding processes during a relatively short period of operation. This is particularly so when the major portion of their work consists of one-of-a-kind items of which the parent metals include cast iron, various steels, aluminum, magnesium, stainless steels, copper, nickel, and other alloys. Electric arc welding of many of these metals is feasible only if the arc is shielded from the oxygen and nitrogen of the atmosphere by means of an envelope of any of the inert gases, such as helium or argon. There are presently available welding heads specifically adapted for performing gas shielded arc welding operation by using a non-consumable electrode, such as tungsten or carbon. Since the cost of such welding apparatus is rather high, it is not practical for small welding shops to own and operate them. In view of the fact that such welding apparatus is capable of welding only with a gas shielded non-consumable electrode, the apparatus does not lend itself for use in conventional arc welding with a consumable coated mild steel electrode. It is also recognized that welding with such a mild steel electrode comprises the greater portion of the work performed in small welding shops. Accordingly, a need exists which will permit such welding shops to utilize the gas shielded welding process by using the apparatus now owned by the shops and used during conventional welding operation employing a consumable electrode.

Therefore, it is the principal object of the present invention to provide an electrode holder adapted for use with a conventional jaw-type arc welding torch in a gas shielded arc welding process.

Another object is to provide an electrode holder for use in a gas shielded arc welding operation which is extermely light and manipulatable.

Another object is to provide a gas conducting electrode receptacle to adapt a jaw-type torch for use in gas shielded arc welding which permits ready adjustment of the electrode to satisfy the welding requirements of a great variety of parent metals.

A still further object of the invention is to provide a chuck member releasably to support an electrode used in gas shielded arc welding, the chuck member serving both as a gas and an electrical conductor.

These, together with other objects, will become more fully apparent upon reference to the following description and accompanying drawing.

Figure 3:
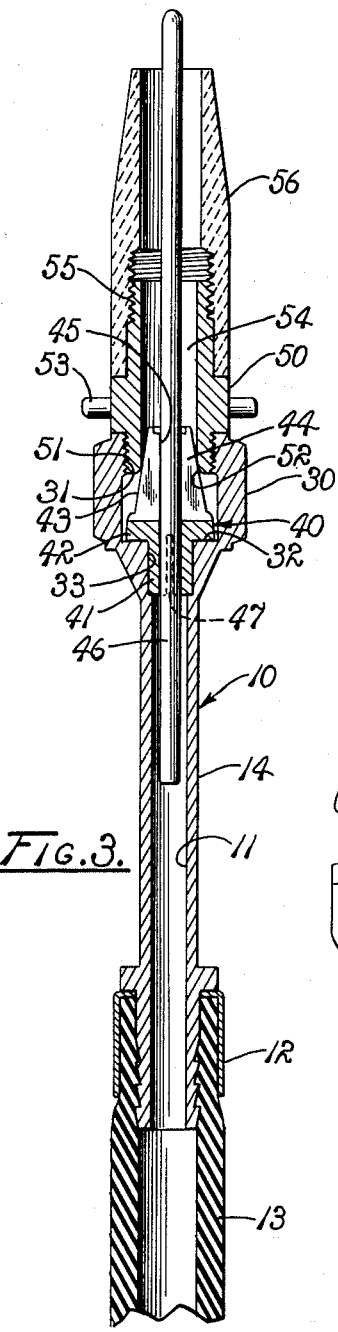
FIG. 3 is an axial section taken on line 3—3 of FIG. 1.
Figure 1:
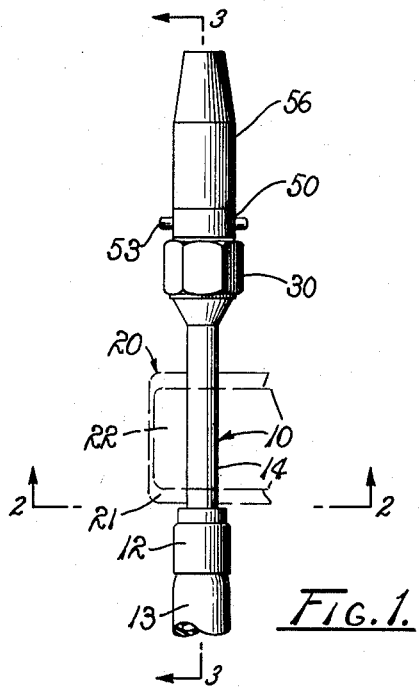
FIG. 1 is a plan view of an electrode holder embodying the present invention held in the jaws of a conventional welding torch.

Referring to the drawing, the electrode holder comprises an elongated tubular body 10 having an axial passageway 11 extending therethrough. By means of a connecting collar 12 securing one end of the body to a flexible hose 13 of rubber, or similar elastomer material having dielectric properties, the axial passageway 11 is in communication with a source of inert gas, not shown. The gas supply is normally provided with pressure and flow regulating means which may be readily adjusted to conform to the gas flow requirements which vary in accordance with the type of parent metal and recommended arc length to be used.

The tubular body 10 of the electrode holder includes an intermediate portion 14, of a reduced diameter, adapted to be received in intimate electrically conducting relationship within the jaws of a conventional welding torch indicated at 20. The torch includes a stationary jaw 21 having a second jaw 22 pivotally mounted thereon and biased toward a closed position by a suitable spring or other means, not shown. A release lever 23 is integral with the pivoted jaw to permit insertion and removal of electrodes during the welding operation. Since the coated, mild steel electrodes used in the greater portion of welding operations conducted in small welding shops are consumed at a rather rapid rate, such a jaw-type torch is used predominantly throughout the full range of the various welding processes. Accordingly, it is an ideal and readily available means to supply welding power to the electrode holder of the present invention. The source of current for welding power is not shown; however, as known to those skilled in the art of gas shielded arc welding with a tungsten electrode, the power source may be either alternating or direct current of either polarity. If a carbon electrode is used, the power source is normally limited to straight polarity direct current.

The outer end of the tubular body 10 terminates in a radially enlarged portion 30 provided with an internally threaded socket 31. The inner axial limit of the socket 31 terminates in an outwardly presented annular face 32 concentric with a counterbore 33. Received within the socket is a chuck or clutch member 40 having an inner piloting shank 41 slidably received within the counterbore 33 to center the chuck radially with respect to the socket 31. A radially projecting flange 42 limits the inward movement of the chuck. The diameters of flange 42 and socket 31 are dimensioned relatively to provide an annular passageway therebetween. The flange 42 also cooperates with an outwardly presented tapered periphery 42 in effecting radial contraction of the chuck. The tapered periphery is preferably one approximating a right-circular cone having a gradual taper to permit selective degrees of radial compression of the chuck.

The tapered portion of the chuck is provided with a plurality of longitudinally extending slots 44 circumferentially spaced about the periphery. These slots permit those portions of the chuck intermediate the slots to be contracted radially to shrink an axial passageway 45 adapted to receive an electrode 46. The pilot shank 41 is provided with similar slots 47 which are extended longitudinally so as to overlap axially with the slots 44 to provide a plurality of passageways for the gas flowing through axial bore 11 of the tubular body through the socket 31.

An annular nut 50 having an externally threaded end 51 is received within the socket 31 to form a screw-thread connection therewith. An annular surface 52 of the nut contacts the tapered periphery 43 of the chuck as the nut is moved axially within the socket. To control the amount of axial movement of the nut 50 and consequently the degree of radial compression of the chuck 40, the surface of the nut is provided with externally presented lugs 53 to afford means of manipulation to contract and to release the chuck in adjusting the projected length of the electrode 46. The annular form of the nut being spaced from electrode provides an annular interval 54 as a passageway for the gas. Secured to an outer threaded end 55 is a nozzle 56 of dielectric material, such as a ceramically matured silicon carbide or other refractory type material.

*Operation*

Figure 2:
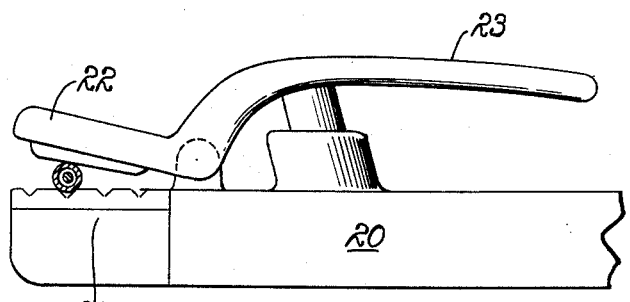
FIG. 2 is a vertical section taken on line 2—2 of FIG. 1.
Figure 4:
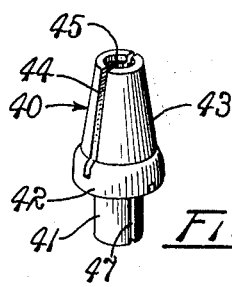
FIG. 4 is a perspective view of the electrode retaining chuck member of the present invention.

The operation of the described embodiment of the subject invention is believed to be readily apparent and is briefly summarized at this point. The welding torch 20 may be quickly converted from use with a consumable electrode by clamping the electrode holder of the present invention within the jaws, as shown in FIG. 2. The non-consumable electrode 46 is then adjusted axially to project from the outer tip of the nozzle 55 a distance dependent upon the length of arc desired, as determined by the parent material of the workpiece. This axial adjustment can be varied quite easily from job-to-job by manipulation of the annular nut 50 through the externally presented lugs 53.

After adjustment of the electrode length, a regulated flow of inert gas is initiated prior to striking an arc between the electrode and the workpiece, not shown. A filler rod, not shown, is then fed into the arc in the same manner as with apparatus which are adaptable only for use in a shielded arc welding process. It can be seen that the elongated tubular body 10 in conjunction with the chuck 40 provides a conductor for both the electric current required during welding as well as the inert gas which shields the arc between the electrode and the work. With the device of the present invention, a conventional jaw-type welding torch may be easily adapted for use in a shielded arc welding process.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In arc welding apparatus including a conventional jaw-type manually operated torch for gas shielded arc welding with a substantially non-consumable electrode applied to a workpiece to form an arc therebetween, a support for holding the electrode and supplying gas and electric current thereto, the support being adapted for use with said conventional torch and comprising an elongated electrically conducting body having current conducting connection with said torch and providing an axial passageway extended therethrough; a flexible gas supplying hose of dielectric material secured to one end of the body in communication with said passageway; a radially projecting collar carried on the other end of the body and provided with an internally threaded bore immediately adjacent to the outer axial extremity, said bore terminating in a radial face located inwardly of the extremity and being provided with a counterbore of reduced diameter and in communication with said passageway; a clutch member received within the collar in abutment with said face and having a pilot portion projecting into the counterbore, the clutch having a plurality of longitudinally extended circumferentially spaced slots at each end to provide gas conducting passageways therethrough and having a frusto-conical periphery at the outer end opposite from said pilot portion; a tubular nut having externally threaded ends one of which is screw-threadably connected with the collar and provided with an axial passageway extended therethrough in communication with the slots of the clutch, the nut having an annular pressure surface adapted to cooperate with the frusto-conical surface of the clutch; gripping means mounted on said nut and extended radially outwardly beyond the electrode support body for positioning the nut inwardly of the collar to compress the slotted portions of the clutch radially inwardly; a ceramic nozzle screw-threadably connected at the opposite end of the nut; and a refractory type electrode received within the support and adjustably secured by the clutch.

2. In apparatus for gas shielded arc welding with a non-consumable electrode applied to a workpiece to form an arc therebetween including a separate source of inert gas flowing at a regulated pressure through a flexible dielectric hose connected to the source and a conventional jaw-type torch connected to a source of electric current; an electrode receptacle to conduct said gas in a shielding relationship to said arc, said receptacle being adapted to be received by the jaws of said torch in current conducting relation therewith and comprising an electrically conductive conduit connected to the electrode, said receptacle also having an axial gas passageway extended therethrough and connected at one end to said supply hose and an opposite end providing an internally threaded socket terminating inwardly in an outwardly presented abutment surface; a chuck received in said socket in contact with said abutment and having an axial passageway for slidably receiving the electrode and an outwardly presented tapered periphery adapted to contract the passageway when subjected to an axial force, the chuck also being provided with a plurality of axially opposed slots extended longitudinally from each end of the chuck but terminating short of the other end and being spaced circumferentially from each other but overlapping axially to provide passageways for the gas; a tubular nut screw-threadably connected with said socket to effect compression of the chuck, said nut having diametrically opposed radially extended lugs projected beyond said electrode receptacle to manipulate the nut during adjustment; and a ceramic nozzle detachably secured to the outer end of said member in a circumscribing relationship to the electrode to provide an annular passageway for the shielding gas to be conducted in the arc.

References Cited in the file of this patent
UNITED STATES PATENTS

| | | |
|---|---|---|
| 1,031,710 | Hanaman | July 9, 1912 |
| 1,336,603 | Baker | Apr. 13, 1920 |
| 2,444,767 | Cobean | July 6, 1948 |
| 2,468,807 | Herbst | May 3, 1949 |
| 2,555,017 | Tuthill | May 29, 1951 |
| 2,606,988 | Dove | Aug. 12, 1952 |
| 2,828,747 | August | Apr. 1, 1958 |
| 2,863,983 | Kane et al. | Dec. 9, 1958 |